Patented Oct. 30, 1928.

1,689,567

UNITED STATES PATENT OFFICE.

PERRY W. TURNER, OF ADA, OHIO.

METHOD OF AND MEANS FOR PROTECTING METAL, WOOD, AND OTHER SUBSTANCES.

No Drawing. Application filed August 18, 1926, Serial No. 130,108, and in Great Britain December 1, 1925.

My method of protecting metal, wood and other substances from the injurious effects of air, water and other gases and liquids consists in coating them with a resistant cement or composition, in attaching to the said coating a suitable fabric and completely enveloping the substances therewith and finally in completely covering the said enveloping fabric with the said protective composition.

The object to be protected is preferably cleaned and it is then completely coated with my novel protective composition which will be described hereinafter. Before the said coating is dry and while it is still sticky, the object is completely enveloped with a suitable textile fabric, such as cotton or other cloth, which, preferably, has been somewhat shrunk by soaking in water and which is somewhat damp. This enveloping fabric is spread evenly upon the sticky coating and it attaches itself thereto and becomes quite smooth upon drying. Care must be taken to over-lap all joints and ends and to stick down all edges well with the composition. When thus completely wrapped with the adhering fabric, and preferably after it becomes dry, the object is given one or more complete coatings of the protective composition, to cover all the fibres of the fabric and to impregnate it and to form a continuous unbroken outer surface or skin upon it and thereby hermetically seal the object thus coated.

Cotton cloth of 48/52 threads to the square inch gives good results in many cases but cloth of jute, asbestos or other fibres may be used, as desired.

My cement or protective composition is composed essentially of a high percentage of kieselguhr or other similar porous silicate or of a mixture of such porous silicates. With this base material I mix a suitable proportion of a filling material such as kaolin or titanium oxide or a mixture of such materials. These dry substances are finely ground and made into a homogeneous emulsion of proper spreading consistency by the addition thereto and the thorough admixture therewith of an adhesive liquid composed essentially of gum copal and turpentine.

This adhesive liquid is made by dissolving approximately 50 parts by weight of powdered gum copal in approximately 10 parts by weight of clarified linseed oil (by heating them together), and then adding approximately 50 parts by weight of turpentine, but I do not limit myself strictly to these proportions or to the use of linseed oil as the gum may be dissolved in a small quantity of collodion or alcohol-ether or other solvent and a greater proportion of turpentine may be used. It is desirable to add the turpentine when warmed in order to prevent an undesirable precipitation of the gum.

I have obtained excellent protective results by employing in my protective composition proportions of kieselguhr varying from 25 to 60 per cent and I will give several examples of compositions that I have found to be useful for various purposes:

(1) 60 parts by weight of kieselguhr
    40 parts by weight of kaolin
(2) 45 parts by weight of kieselguhr
    25 parts by weight of kaolin
    10 parts by weight of titanium oxide
(3) 45 parts by weight of kieselguhr
    20 parts by weight of kaolin
    25 parts by weight of zinc oxide
(4) 25 parts by weight of kieselguhr
    34 parts by weight of talc
    6 parts by weight of kaolin
    20 parts by weight of finely ground asbestos
    15 parts by weight of zinc oxide.

Talc, slate or alumina may replace part or all of the kaolin. Zinc oxide, titanium oxide, lithopone, white lead or lead sulphate may be added in varying proportions. Finely-ground asbestos may be added in moderate quantities, if desired.

Coloring matter may be added provided it is of a kind that will not interfere with the stability or homogeneity of the composition, e. g. iron oxide, ultramarine or the like.

Terebene or additional turpentine may be added to thin the adhesive liquid or the composition, if they are too thick.

The dry ingredients are mixed or ground with sufficient of the adhesive liquid to make a thick emulsion. The mixture should be as intimate as possible, for best results. The use of a ball-mill or of a high-speed emulsor or other suitable apparatus for effecting this object is desirable.

Objects coated with my composition and well-wrapped and then sealed with it, according to my method above-described, offer unusual resistance to the effects of air and of water and of other gases and liquids.

Having thus described the invention, what is claimed is:

A method of protecting a substance which comprises completely enclosing said substance with a protective coating composition, attaching to said coating before it is dry a moist fabric to cover the substance, allowing the fabric to dry and shrink, and covering and impregnating the fabric thereafter with said protective composition.

In testimony whereof I affix my hand this seventeenth day of August, 1926.

PERRY W. TURNER.